（12） United States Patent
Sadjadi

(10) Patent No.: US 7,743,146 B2
(45) Date of Patent: *Jun. 22, 2010

(54) CONTROLLING ACCESS OF CONCURRENT USERS OF COMPUTER RESOURCES IN A DISTRIBUTED SYSTEM USING AN IMPROVED SEMAPHORE COUNTING APPROACH

(75) Inventor: Shahrokh Sadjadi, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 11/960,376

(22) Filed: Dec. 19, 2007

(65) Prior Publication Data

US 2008/0162481 A1 Jul. 3, 2008

Related U.S. Application Data

(63) Continuation of application No. 09/774,906, filed on Jan. 30, 2001, now Pat. No. 7,328,263.

(51) Int. Cl.
*G06F 15/16* (2006.01)
*G06F 17/00* (2006.01)

(52) U.S. Cl. .................. 709/225; 709/203; 709/208; 709/209; 709/210; 709/211; 709/212; 709/217; 709/219; 709/223; 707/8; 710/200; 711/151; 711/152; 711/153; 711/168

(58) Field of Classification Search .............. 709/225, 709/208–209, 210–212, 217, 219, 223; 707/8; 710/200; 711/151–153, 168
See application file for complete search history.

(56) References Cited

U.S. PATENT DOCUMENTS

| 4,574,350 | A | | 3/1986 | Starr |
| 4,716,528 | A | | 12/1987 | Crus et al. |
| 5,193,194 | A | * | 3/1993 | Gruender et al. ............ 711/151 |
| 5,355,477 | A | | 10/1994 | Strickland et al. |
| 5,410,697 | A | * | 4/1995 | Baird et al. .................. 711/152 |
| 5,432,929 | A | | 7/1995 | Escola et al. |
| 5,442,763 | A | * | 8/1995 | Bartfai et al. ............... 711/145 |

(Continued)

*Primary Examiner*—Alina N. Boutah
(74) *Attorney, Agent, or Firm*—Hickman Palermo Truong & Becker LLP

(57) ABSTRACT

A method of controlling concurrent users of a distributed resource on a network is disclosed. In one aspect, there are one or more local lock managers executing on corresponding hosts and cooperating as a distributed lock manager. The resource is limited to a maximum number of concurrent users. A user identification for each user is associated with one host. In response to a request associated with a particular user associated with a first host, a lock is requested from a first local lock manager process executing on the first host. A related method of handling a request for a count-limited resource includes receiving a request from a client process for the computer resource. If it is determined that the request exceeds a maximum count for the resource, then it is determined whether a current time is within a retry time period of the client's first request. If it is determined the current time is within the retry time period, then it is automatically determined again whether the request exceeds the maximum count for the resource. If it is determined that the request does not exceed the maximum count, then the resource is provided to the client process.

20 Claims, 8 Drawing Sheets

U.S. PATENT DOCUMENTS

| | | | |
|---|---|---|---|
| 5,485,607 A * | 1/1996 | Lomet et al. ................... 707/8 |
| 5,490,270 A | 2/1996 | Devarakonda et al. |
| 5,551,046 A | 8/1996 | Mohan et al. |
| 5,596,754 A * | 1/1997 | Lomet ........................ 710/200 |
| 5,692,178 A | 11/1997 | Shaughnessy |
| 5,708,808 A | 1/1998 | Shoichi |
| 5,721,943 A | 2/1998 | Johnson |
| 5,742,813 A | 4/1998 | Kavanagh et al. |
| 5,774,660 A | 6/1998 | Brendel et al. |
| 5,813,016 A | 9/1998 | Sumimoto |
| 5,832,484 A | 11/1998 | Sankaran et al. |
| 5,872,981 A * | 2/1999 | Waddington et al. ......... 710/200 |
| 5,893,157 A * | 4/1999 | Greenspan et al. .......... 711/150 |
| 5,913,213 A | 6/1999 | Wikstrom et al. |
| 5,941,975 A | 8/1999 | Park et al. |
| 5,956,712 A | 9/1999 | Bennett et al. |
| 5,983,225 A * | 11/1999 | Anfindsen ..................... 707/8 |
| 5,987,477 A * | 11/1999 | Schmuck et al. ............. 707/201 |
| 5,999,930 A | 12/1999 | Wolff |
| 6,009,427 A | 12/1999 | Wolff |
| 6,012,094 A | 1/2000 | Leymann et al. |
| 6,023,721 A | 2/2000 | Cummings |
| 6,026,401 A | 2/2000 | Brealey et al. |
| 6,041,384 A * | 3/2000 | Waddington et al. ......... 710/200 |
| 6,101,569 A | 8/2000 | Miyamoto et al. |
| 6,128,644 A | 10/2000 | Nozaki |
| 6,128,710 A * | 10/2000 | Greenspan et al. .......... 711/152 |
| 6,151,659 A | 11/2000 | Solomon et al. |
| 6,205,477 B1 | 3/2001 | Johnson et al. |
| 6,253,236 B1 | 6/2001 | Troxel et al. |
| 6,324,580 B1 | 11/2001 | Jindal et al. |
| 6,324,581 B1 * | 11/2001 | Xu et al. ..................... 709/229 |
| 6,327,622 B1 | 12/2001 | Jindal et al. |
| 6,405,274 B1 * | 6/2002 | Chan ........................ 710/200 |
| 6,457,098 B1 * | 9/2002 | DeKoning et al. .......... 711/114 |
| 6,466,982 B1 | 10/2002 | Ruberg |
| 6,477,522 B1 | 11/2002 | Young |
| 6,493,804 B1 | 12/2002 | Soltis et al. |
| 6,510,437 B1 | 1/2003 | Bak et al. |
| 6,513,061 B1 | 1/2003 | Ebata et al. |
| 6,529,933 B1 | 3/2003 | Montgomery et al. |
| 6,567,818 B1 * | 5/2003 | Frey et al. .............. 707/103 R |
| 6,578,066 B1 | 6/2003 | Logan et al. |
| 6,606,626 B1 * | 8/2003 | Ponnekanti .................... 707/8 |
| 6,697,846 B1 * | 2/2004 | Soltis ........................ 709/217 |
| 6,711,137 B1 | 3/2004 | Klassen et al. |
| 6,732,124 B1 * | 5/2004 | Koseki et al. ............... 707/202 |
| 6,748,426 B1 | 6/2004 | Shaffer et al. |
| 6,795,434 B1 | 9/2004 | Kumar et al. |
| 6,795,858 B1 | 9/2004 | Jain et al. |
| 6,823,337 B2 | 11/2004 | Armstrong et al. |
| 6,826,570 B1 * | 11/2004 | Eshel et al. .................... 707/8 |
| 6,850,980 B1 | 2/2005 | Gourlay |
| 6,883,026 B1 | 4/2005 | Onodera et al. |
| 6,931,430 B1 | 8/2005 | Lynch |
| 6,963,847 B1 | 11/2005 | Kennedy et al. |
| 6,965,893 B1 * | 11/2005 | Chan et al. .................... 707/8 |
| 7,113,986 B2 | 9/2006 | Goldszmidt et al. |
| 7,206,805 B1 | 4/2007 | McLaughlin |
| 2003/0051113 A1 | 3/2003 | Beardsley et al. |
| 2003/0208673 A1 | 11/2003 | Chaudhry et al. |
| 2005/0018611 A1 | 1/2005 | Chan et al. |

* cited by examiner

> 330
> TO BALANCE NETWORK TRAFFIC ON HOSTS,
> LOAD BALANCER INCREMENTS RESOURCE MAXIMUM
> ON ONE HOST AND DECREMENTS RESOURCE MAXIMUM
> ON ANOTHER HOST
> KEEPING CONSTANT AGGREGATE OF ALL MAXIMA
> FOR EACH PARTICULAR RESOURCE

FIG. 3A

> 330a
>
> > 331
> > ON REGULAR SCHEDULE, LOAD BALANCER
> > DECREMENTS RESOURCE MAXIMUM ON ONE HOST
> > AND INCREMENTS RESOURCE MAXIMUM ON ANOTHER HOST

CONTROLLING ACCESS OF CONCURRENT USERS OF COMPUTER RESOURCES IN A DISTRIBUTED SYSTEM USING AN IMPROVED SEMAPHORE COUNTING APPROACH

PRIORITY CLAIM

This application claims benefit as a Continuation of U.S. patent application Ser. No. 09/774,906, filed on Jan. 30, 2001 now U.S. Pat. No. 7,328,263 the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention generally relates to limiting concurrent access to shared resources. The invention relates more specifically to a semaphore counting approach that is augmented with automatic retries or a lock manager in a distributed system for limiting access to shared resources.

BACKGROUND

A distributed computing system includes two or more computing devices connected by a network. The network involves one or more network devices such as hubs, bridges, routers, and gateways connected to each other, which control the flow of information among the devices. Networks using different protocols for exchanging information can be connected to each other using internetworking devices such as gateways. The Internet is a public network of networks made possible with internetworking devices. As used herein, network devices shall mean both network and internetworking devices. Network devices may include programmable processors controlled by software stored at the device.

In typical distributed systems, processes run separately on the separate devices, and communicate with each other by sending messages. One process, the client process, initiates the communication by sending a request to another process, the server process, on another device. The message is addressed using an appropriate network protocol. The server process responds to the client's request and may issue a response message sent back to the client process using the appropriate protocol.

A primary advantage of distributed systems is that a computer resource, such as a computer controlled device, like a printer, or computer readable data, as in a database, or computer programs, as in a dynamic link library, may reside primarily at one device on the network, and still may be accessed from any other device on the network. There is sometimes a limit on concurrent users of a resource; that is, there is a limit on how many users of the network can access a particular resource at one time.

For example, providers of resources often license the resources for use in the distributed system in exchange for a fee. Many providers charge a fee that is related to the number of users of the resource. Some of these fees are expressed as a fixed fee for any number of users up to a maximum number of concurrent users, where the maximum is specified in the license.

One past approach used by network administrators to enforce compliance with the license is counting semaphores using facilities available through the operating system on the computing device providing the resource. The semaphore is a memory location shared by all the processes running in parallel on the computing device. A counting semaphore can be incremented and decremented within limiting maximum and minimum values. Whenever a client requests the resource, a server process on the computing device with the resource checks the counting semaphore. If the value stored in the counting semaphore is less than the maximum number of concurrent users, the process increments the semaphore and proceeds with using the resource. When the server process finishes its use of the resource, the server decrements the semaphore. If the value stored in the counting semaphore is not less than the maximum number of concurrent users, then, when the client requests the resource, the server process denies access to the resource.

The popularity of networks has lead to growth in the size and extent of networks. Networks are used to connect the operations of an enterprise that might be widely separated geographically, e.g., with facilities in New York, San Diego, Tokyo and Milan. Some enterprises may use the Internet to provide the wide geographical scope needed. Preferred network architecture is scalable to any size demanded to satisfy the purposes of the network. As the networks expand in size and scope, a resource available on a single machine in a distributed system may become a bottleneck. To achieve scalability, a resource may be reproduced to be available on several computing devices on the distributed system. However, when a resource subject to a maximum number of concurrent users is placed on several computing devices, there are disadvantages to using counting semaphores on each of the computing devices.

For example, if the license allows 100 users, and the resource is reproduced on four computing devices, then the 100 licenses must be spread among the four devices. The 100 licenses may be distributed as 25 licenses for each of the four devices, represented by the characters A, B, C and D. This can lead to loss of access to the resource on one of the devices when the aggregated number of users is well below the maximum allowed by the license. For example, the $26^{th}$ user on device A will be denied access even if there are only ten users each on devices B, C and D. The $56^{th}$ user is denied access, in effect reducing the number of allowed users to 55, well short of the 100 users that have been paid for.

One past approach used to enforce compliance with the license on a distributed system is to have a license server on one computing device called a license server host for the distributed system. All requests for the resource are directed to the one license server host. The license server uses a counting semaphore of the operating system on the license server host to determine when the maximum number of users on the distributed system is reached. If the request is not denied, then the request for the resource is forwarded to one of the distributed devices providing the resource.

A disadvantage of this approach is that the license server host becomes a bottleneck for all traffic requesting the resource. Furthermore, if the license server host breaks down or otherwise goes offline, the resource becomes unavailable to all users. This approach does not scale with the growth of the number of network devices employed to meet growth in the use of the network.

There are additional disadvantages to past approaches, whether several license servers are used or a central license server is used. For example, when a request for a resource is denied, all the user can do is try again at a later time. This requirement for repeated tries until a requested resource becomes available is wasteful, tedious and frustrating. Furthermore, the repeated requests consume network bandwidth and can slow other network traffic.

In addition, the counting semaphore, as an operating system function, is not readily extensible. This is a disadvantage when additional functionality is desired, for example to forward control to a different resource when the requested resource is unavailable.

Based on the foregoing, there is a clear need for replacing operating system counting semaphores to control concurrent access to a shared resource with a mechanism that is extensible, that consumes less bandwidth, that is less frustrating to human users, and that is scalable with distributed systems.

SUMMARY

The foregoing needs, and other needs that will become apparent from the following description, are achieved in the present invention, which comprises, in one aspect, a method and apparatus for controlling concurrent users of a distributed resource. The method includes receiving a request from a client process for the computer resource. If it is determined that the request exceeds a maximum count for the resource, then it is determined whether a current time is within a retry time period of the client's first request. If it is determined the current time is within the retry time period, then it is automatically determined again whether the request exceeds the maximum count for the resource. If it is determined that the request does not exceed the maximum count, then the resource is provided to the client process.

In another aspect, a method of controlling a number of concurrent users of a distributed resource on a network includes a distributed lock manager that may have a plurality of local lock managers executing on a corresponding plurality of hosts. The resource is limited to a maximum number of concurrent users. A user identification for each user is associated with one host. In response to a request associated with a particular user associated with a first host, a lock is requested from a first local lock manager process executing on the first host.

In another aspect, a method of controlling a number of concurrent users of a distributed resource on a network includes receiving a request for the distributed resource from a client process for a user having a user identification. The resource is limited to a maximum number of concurrent users. One home location associated with the user identification is determined. The home location indicates a unique host. A request for a lock object for the distributed resource is sent to a local lock manager. The request includes the home location. The lock object for the distributed resource is received from a second local lock manager, if a number of outstanding locks granted by the second local lock manager is less than a local resource maximum defined for the second local lock manager. Access to the resource is provided to the first client in response to receiving the lock object.

In another aspect, a method of controlling a number of concurrent users of a distributed resource on a network includes receiving at a local lock manager a request from a resource server for a lock object for the distributed resource. The distributed resource is limited to a maximum number of concurrent users. The request includes data indicating a particular user home location. It is determined whether a second local lock manager is associated with the particular user home location, and if so, then the lock object is requested from the second local lock manager.

In another aspect, a method of distributing a resource on a network includes providing a distributed lock manager. The resource is limited to a maximum number of concurrent users.

A value is generated for a local resource maximum number of users stored on each host. A local lock manager can grant a lock for the resource if the number of outstanding locks granted by the local lock manager is less than a value of the local resource maximum stored on the corresponding host. A summation over all the hosts of the value for the local resource maximum yields an aggregate value that does not exceed the maximum number of concurrent users. It is determined whether to increase a first value in a first resource maximum stored on a first host, and if so, then a second value in a second resource maximum stored on a second host is decreased by a particular amount, and the first value in the first resource maximum stored on the first host is increased by the same amount.

In other aspects, the invention encompasses a computer readable medium and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a flowchart that illustrates a high level overview of a load balancer process for adjusting a maximum number of resources associated with each lock manager of the distributed lock manager according to an embodiment;

FIG. 3B is a flowchart that illustrates an embodiment of a step shown in FIG. 3A;

DETAILED DESCRIPTION

A method and apparatus for controlling concurrent users of a distributed resource is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

Embodiments are described in the context of a secure network, such as a virtual private network, which requires a user to log onto the network with a user identification and to pass an authentication process before the user is allowed access to the network and its resources. Embodiments may be practiced outside this context, where the user is identified simply by a network address for a client process operating on the user's computing device.

Figure 1:
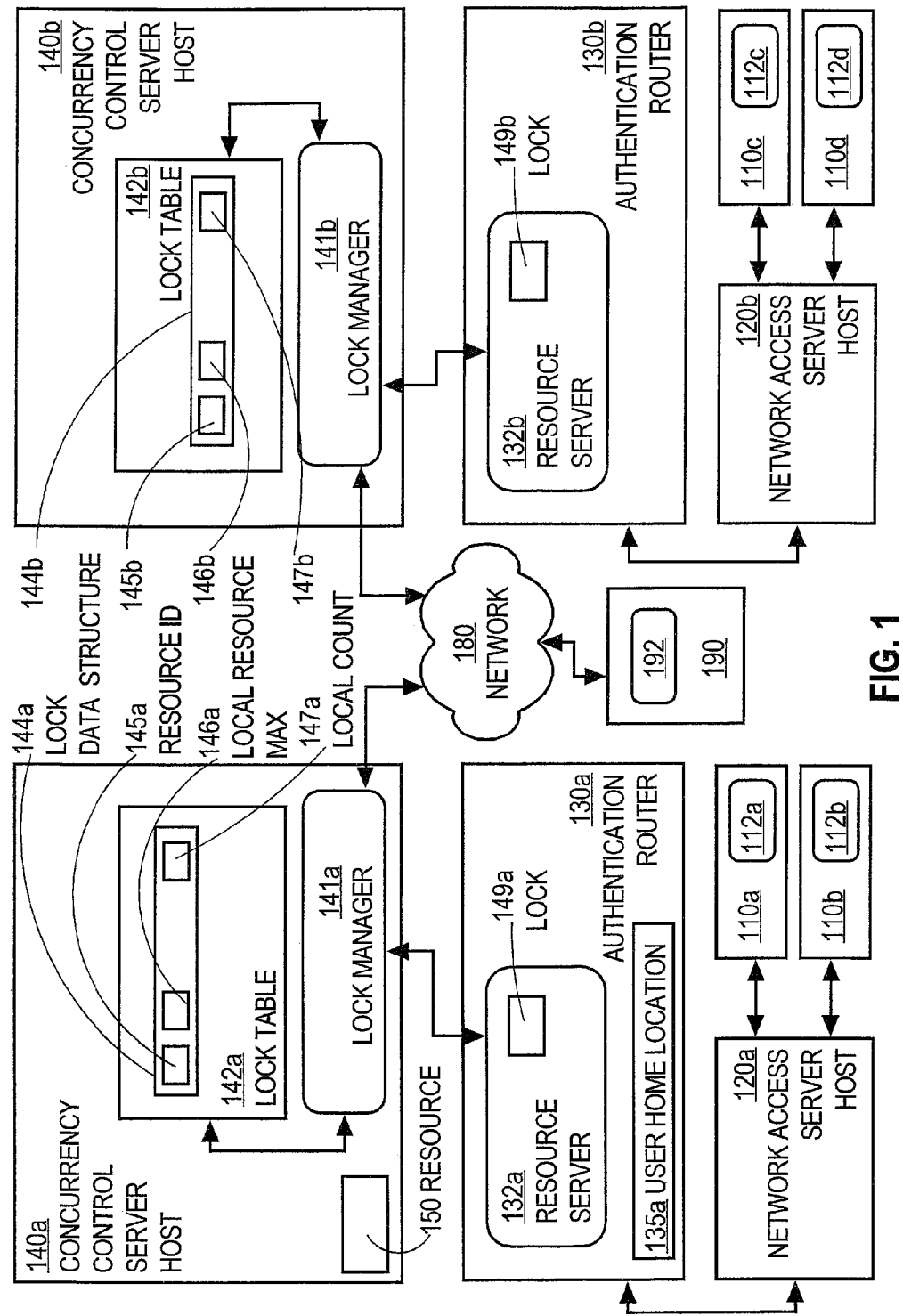
FIG. 1 is a block diagram that illustrates a structural overview of a distributed lock manager process for controlling a number of concurrent users of a distributed resource according to an embodiment.

FIG. 1 is a block diagram that illustrates a structural overview of a distributed lock manager process for controlling a number of concurrent users of a distributed resource according to an embodiment for a secure network. In this embodiment, a user interacts with a client process 112 operating on a user terminal computing device 110. One or more user terminals 110 are connected to a network access server host 120, which runs a network access server process. The network access server host is connected to an authentication router 130, which provides information about authorized users and their permissions. If a user operating a client process 112 does not pass authentication based on information provided by the authentication router 130, the network access server executing on the network access server host 120 will deny access to the network and its resources.

Authentication router 130 also executes a resource server process 132 to provide access to a distributed resource 150 for which a maximum number of concurrent users is defined, such as by a license agreement. In other embodiments, the resource server process 132 executes on the network access server host 120 or on a separate device, such as a concurrency control server host 140 or some other device.

A local network comprises a single authentication router 130, a single concurrency control server host 140, a network access server host 120, and multiple user terminals 110. For example, a first local network comprises a first router 130a, a first concurrency control server host 140a, a first network access server host 120a, and multiple user terminals 110a and 110b. In other embodiments, other network access servers connected to still other user terminals are also connected to the first authentication router 130a.

A second local network comprises a second router 130b, a second concurrency control server host 140b, a second network access server host 120b, and multiple user terminals 110c and 110d. In other embodiments, other network access servers connected to still other user terminals are also connected to the second authentication router 130b. In embodiments without an authentication router, any local processes described herein may execute on a single local host.

The first and second local networks are connected via a network 180, such as the Internet. In other embodiments, one or more other local networks are also connected to the network 180. Also connected to the network 180 in the illustrated embodiment is a load balancing computing device 190 executing a load balancing process 192. In other embodiments the load balancing process is absent or is hosted on the first local network or the second local network or other local network or some combination of these.

The distributed resource 150 resides on concurrency control server host 140a in the first local network. In other embodiments the distributed resource resides on another computing device connected to one or more of the routers 130 on one or more of the local networks. In still other embodiments, one or more copies of the distributed resource reside on one or more other computing devices connected to one or more of the routers 130.

The resource server process is a client of a distributed lock manager 141 comprising a plurality of local lock managers. For example local lock manager 141a receives requests from resource server 132a in the first local network. The local lock manager executes on the concurrency control server host. In other embodiments, the local lock manager executes on another host connected to the router, or, if there is no router, then on the single host connected to the terminals 110.

Structural Overview

The distributed lock manager 141 utilizes a lock data structure 144 stored on a computer readable medium, such as volatile computer memory or persistent records on a disk. The illustrated lock data structure 144 includes a resource ID field 145, a local resource maximum field 146, and a local count field 147. The resource ID field uniquely identifies the distributed resource 150. The local resource maximum field 146 holds data indicating the maximum number of locks the local lock manager may grant. It is the local lock manager's allowance for granting locks. The local count field 147 holds data indicating the number of outstanding locks the local lock manager has granted. The locks are outstanding if they have not yet been released back to the local lock manager from the process that obtained the lock. The lock data structures 144 for multiple resources are stored in a lock table 142. Each local network includes one host, such as the concurrency server control host 140, associated with the local lock manager and connected to the local authentication router 130.

The distributed lock manager 141 provides a lock object 149 to a resource server 132. The lock object includes data indicating that the resource server may provide access to the distributed resource 150 to a requesting client process 112. As used herein, an object refers to a group of data including attributes, values of the attributes, methods, or any combination of these. The group can be referenced by a unique identifier.

The distributed lock manager 141 is made up of one or more local lock managers each with its own lock data structure for distributed resource 150. For example, local lock manager 141a maintains a lock table 142a including a lock data structure 144a in which the resource ID field 145a holds data that identifies distributed resource 150. The allowance of locks local lock manager 141a can grant is recorded in the local resource maximum field 146a. The actual number of outstanding locks granted by local lock manager 141a, not yet released back to the local lock manager 141a, is recorded in the local count field 147a.

Referring again to FIG. 1, a user home location 135a is stored in a computer readable medium in the authentication router 130a of the first local network. The user home location 135a includes data indicating a host for a local lock manager in one of the local networks. The indicated host is associated with a user who happens to be operating a client 112 on a terminal 110 in the first local network. The data in the user home location 135a is based on the user's identification. Several embodiments for methods by which the user home ID is based on the user identification are described in more detail in a later section.

Using one or more of the structures described in this section, a process can control the number of concurrent users of the distributed resource 150, as described in the following sections. In one embodiment, an aggregate of the values stored in the local resource maximum fields in the local data structures for a particular distributed resource over all the local lock managers in the distributed lock manager 141 is less than or equal to the maximum number of concurrent users allowed for the particular distributed resource. That is, the sum of the local allowances is less than or equal to the maximum number of concurrent users for the network resource. The value stored in each local resource maximum field is based on factors unique to the local network, such as the particular users expected to log onto terminals in the local network, or the time of day, or actual demands for the resource by the users of a local network, as described in more detail below.

Functional Overview

Figure 2A:
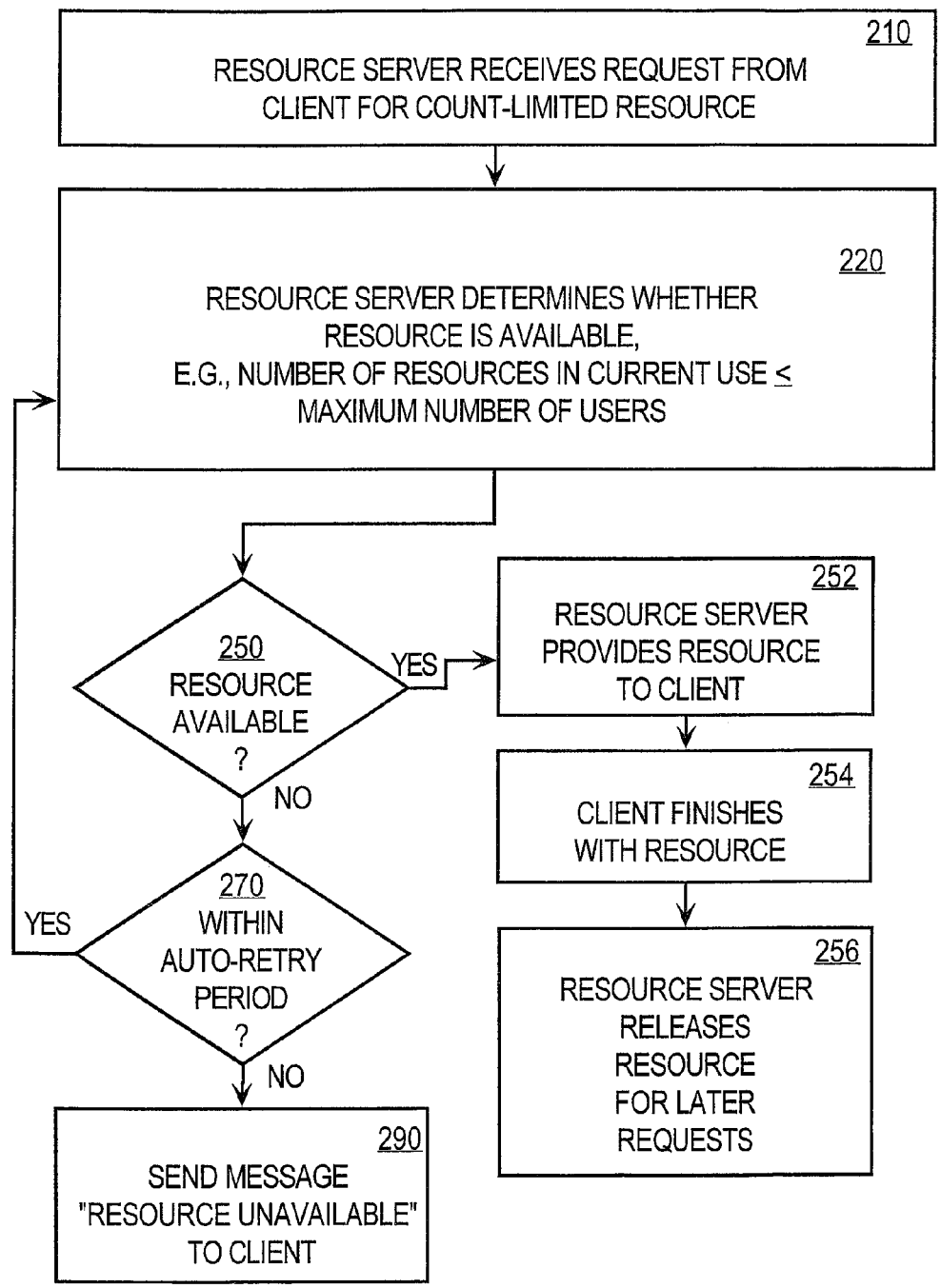
FIG. 2A is a flowchart that illustrates a high level overview of one embodiment of a method for controlling a number of concurrent users of a distributed resource.

FIG. 2A is a flowchart that illustrates a high level overview of one embodiment of a method for controlling a number of concurrent users of a distributed resource using a resource server.

In step 210, the resource server receives a request from a client process for the distributed, count-limited resource subject to a maximum number of concurrent users.

In step 220, the resource server determines whether the resource can be made available to the requesting client. For example, the resource server uses a counting semaphore to determine whether the number of resources in current use is less than or equal to the maximum number of concurrent users. As another example, the resource server requests a lock from a distributed lock manager as is described in more detail in a later section.

In step 250, the process determines whether the resource is available. If so, control passes to step 252, in which the resource server allows a client process to access the distributed resource. In step 254, the client process utilizes the resource and finishes with it. In step 256, the resource server releases the resource for use in response to a later request by the same or different client process.

If the process determines in step 250 that the resource is not available, then control passes to step 270. In step 270, the resource server determines whether the current time is within an auto-retry time period of the time the resource server first received the current request from the client process. If so, then the resource server automatically returns control to step 220 to again determine whether the resource is available. If not, then control passes to step 290, in which the resource server sends a message to the client process that the resource is unavailable.

Automatic Retry

By using an auto-retry period, a user operating the client process at a terminal of the network is required to repeatedly request a particular resource until that resource becomes available. Instead, the resource is given to the requesting user automatically as soon as it becomes available.

For example, if the resource is a computer language compiler, and the maximum number of concurrent users is reached, then the next user cannot obtain access to the compiler. With conventional resource servers, the user must request the compiler again, and must do so repeatedly to obtain use of the compiler. If none of the concurrent users has completed his or her use of the compiler, the repeated request will also be denied. The next user is tied to the terminal and forced to repeatedly request the compiler until it becomes available. This prevents the user from moving onto other tasks the user must accomplish or from going home at the end of a workday. This is especially a disadvantage if the expected compilation process may require several hours to complete. At some point, the next user is forced to abandon the effort to access the compiler, and the user moves onto the next task or leaves the workplace for the day. The next user is unable to launch the compile process in the background before moving onto these other tasks or leaving the workplace. When the next user returns at some later time to request the compiler, even if the request is then granted, the user is forced to wait the several hours required to complete the compilation. This circumstance reduces the productivity of the user, is likely to increase the frustration of the user, and degrades the perceived performance of the network.

Figure 2B:
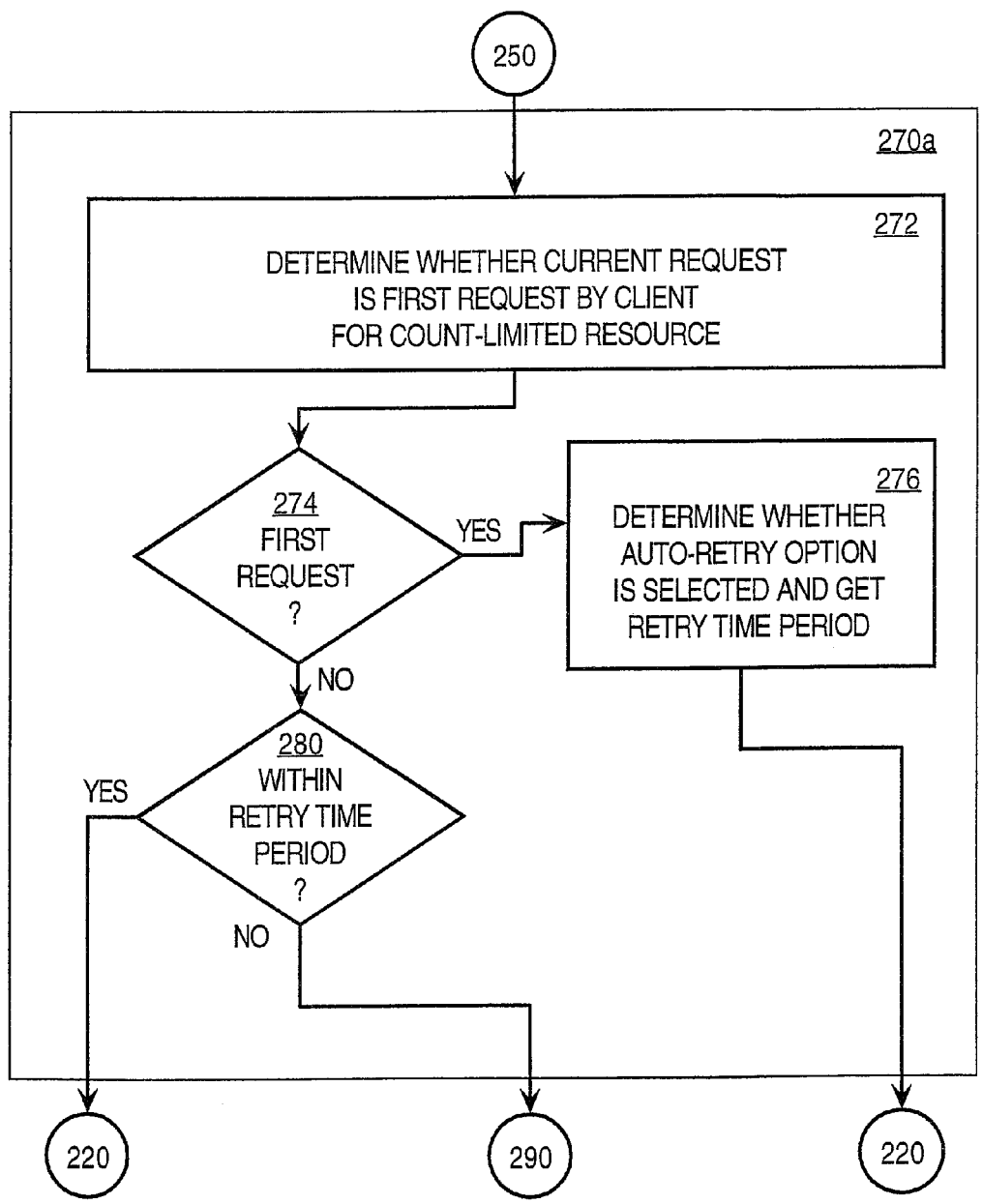
FIG. 2B is a flowchart that illustrates an embodiment of a step shown in FIG. 2A.

FIG. 2B is a flowchart that illustrates an embodiment 270*a* of step 270 shown in FIG. 2A for determining whether the current time is within the auto retry-period. This embodiment allows the user to specify the retry time period when the request for access to the distributed resource is first denied.

In step 272, after a request has been denied, it is determined whether the current request from the client process is a first request by the client process for the distributed resource. For example, it can be determined whether a message allowing the user to set the retry time has already been sent to the client process for display to the user.

Step 274 represents a branch point based on whether the current request is a first request by the client process. If the current request is the first request by the client process, then control passes to step 276. In step 276, the process determines whether an auto-retry sub-process has been selected, and if so, what retry time value is to be used. In an embodiment, the auto-retry process and the auto-retry time value are specified in program code or by a call to an application programming interface method. If the auto-retry option is selected, control passes back to step 220, shown in FIG. 2A, to request the distributed resource again automatically. If not, control passes to step 290, shown in FIG. 2A, to report to the client process that the resource is unavailable.

If the current request is not the first request by the client process, control passes to step 280. Step 280 represents the branch point based on whether the current time is within the retry time period from the time of the first request from the client received by the resource server. If the current time is within the retry period, control passes back to step 220, shown in FIG. 2A, to request the distributed resource again automatically. In one embodiment, the resource server waits a predetermined delay period during step 280 before returning to step 220.

Control passes to step 290, as shown in FIG. 2A, to report to the client process that the resource is unavailable, if the current time is not within the retry time period. For example, the current time is not within the retry time period when no retry time period is specified or when the retry time period is 0, or if the retry time period is 1 hour and the elapsed time since the first request is 1 hour and 1 second.

A user of the client process making the request may not be interacting directly with the particular client process that requested the resource from the resource server. Instead, the user may be interacting with a different client process indirectly making a request from the resource server through the particular client process. For example, referring to FIG. 1, the particular client process making the request for the resource from the resource server 132*a*, may be an authentication process executing on authentication router 130*a*, in response to a request by a network access server process executing on the network access server host 120*a*, itself acting in response to a request by a client process 112*a* executing on terminal 110*a*. In this case, the user is interacting directly with client process 112*a* and indirectly with the authentication process. As used herein, the user of the authentication process making the request for the distributed resource is the user interacting directly with client process 122 a and only indirectly with the authentication process. Thus, the dialog box described in step 276 is presented to the user by the client process 112*a* with which the user is directly interacting. The dialog box may be passed from the resource server to the client process 112*a* through the other client processes acting between the client process 112*a* and the resource server 132*a*.

Distributed Lock Manager

Figure 2C:
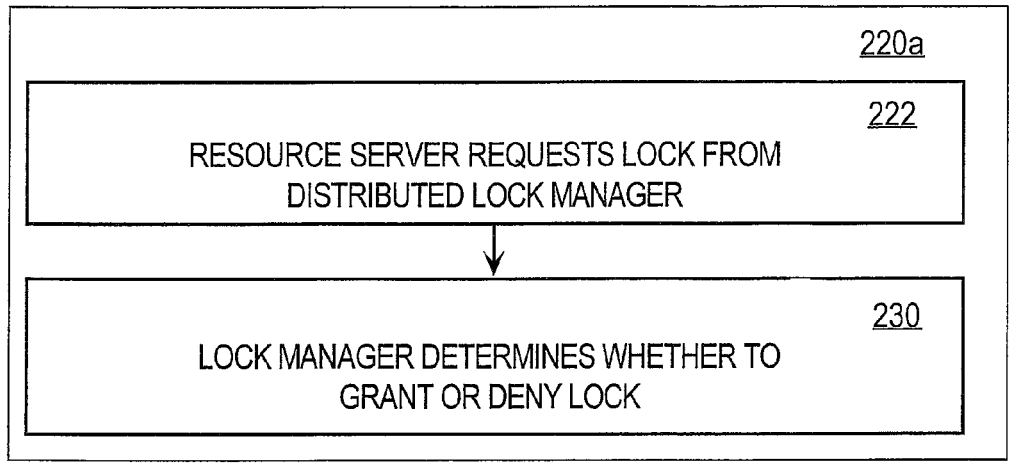
FIG. 2C is a flowchart that illustrates an embodiment of another step shown in FIG. 2A.

FIG. 2C is a flowchart that illustrates an embodiment 220*a* of step 220 shown in FIG. 2A.

In step 222, the resource server determines whether the resource is available by requesting a lock from the distributed lock manager. In step 230, the distributed lock manager determines whether to grant or deny the lock for the distributed resource. If the distributed lock manager determines to grant the lock based on information in lock data structure 144b associated with local lock manager 141b, then local lock manager 141b increments the value in the local count field 147b. Details on a particular embodiment of step 230 are described in a later section.

Figure 2D:
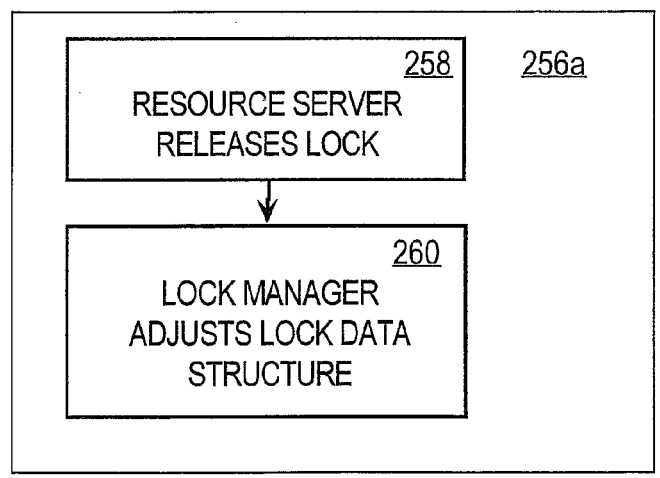
FIG. 2D is a flowchart that illustrates an embodiment of another step shown in FIG. 2A.

FIG. 2D is a flowchart that illustrates an embodiment 256a of step 256 shown in FIG. 2A, which embodiment is complementary to embodiment 220a.

If a lock manager is called by the resource server in step 222, as described above, then in step 258, the resource server releases the lock. In response, the distributed lock manager adjusts a value stored in the lock data structure in step 260. For example, if the distributed lock manager determines to grant the lock in step 230 above based on information in lock data structure 144b associated with local lock manager 141b, then when the resource server releases the lock in step 258, local lock manager 141b decrements the value in the local count field 147b.

Distribution of Local Resource Maxima by User Home Host

In the embodiments of FIG. 2C and FIG. 2D, the distributed lock manager 141 determines which local lock manager determines whether to grant or deny a lock for the resource to a particular client process. In one embodiment, the local lock manager on the same local network as the client process determines whether to grant or deny the lock. In another embodiment, a local lock manager associated with a user of the client process determines whether to grant or deny the lock. As described in this section, in one embodiment, a user is associated with a local lock manager according to where the user is expected to usually sign onto the network.

For example, in the embodiment depicted in FIG. 1, a user is associated with local lock manager 141b if the user is usually expected to sign on to one of the terminals 110c and 110d going through the same authentication router 130b connected to the concurrency control server host 140b where the local lock manager 141b executes. The second local network is the user's home location. In this arrangement, network traffic is expected to be low because the local lock manager 141b is close to the terminals 110 in terms of network topology, such as the number of devices between the host 140b for the local lock manager 141b and the terminal 110c where the user is.

However, if the user occasionally travels, and logs onto the network on one of the terminals 110a, 110b at another facility, the user's request is still handled by the local lock manager 141b. That is, the visitor does not consume one of the locks allocated to local lock manager 141a. This is an advantage because it allows the local resource maximum to be set based on a readily understood, typical distribution of users. The cost of preventing the visitor from consuming a lock in the allowance of the local lock manager 141a is some increased network traffic between local lock manager 141a and local lock manager 141b of the distributed lock manager.

Figure 2E:
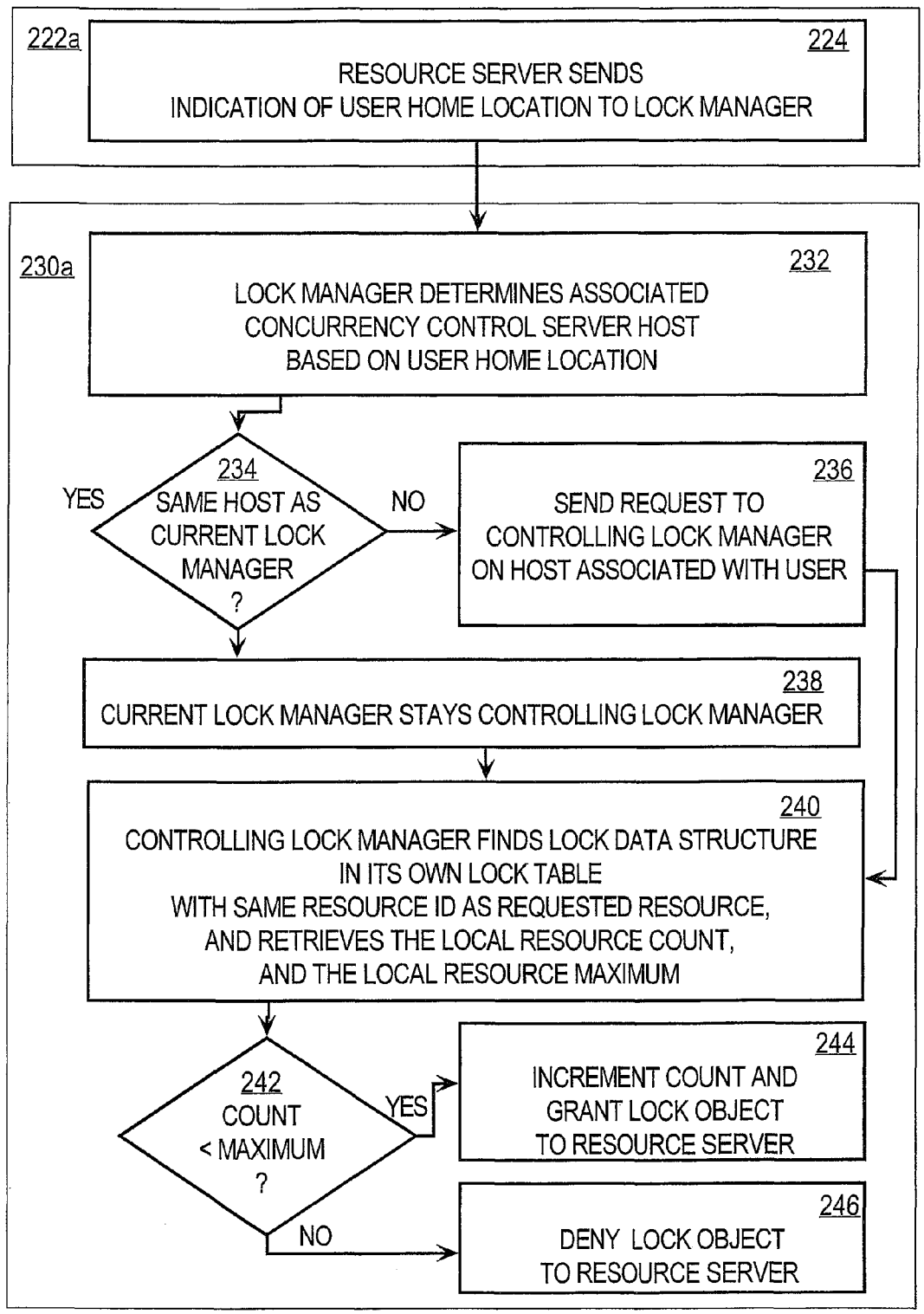
FIG. 2E is a flowchart that illustrates an embodiment of two steps shown in FIG. 2C.

FIG. 2E is a flowchart that illustrates embodiments 222a, 230a of the two steps 222, 230 shown in FIG. 2C for handling a request for the distributed resource using a local lock manager associated with a home location of a user.

In step 224, the resource server includes an indication of the user's home location in the request to the distributed lock manager. As used herein, the user's home location indicates one and only one host of a local lock manager. Any known method for indicating a computing device serving as a home location may be employed, such as a network address of the host itself, a network address of the authentication router 130 connected to the host, and a domain name for either the host or the router.

Further, any known method for associating a user with one and only one indication of a computing device may be employed. For example, the user ID can be used as input to a hashing function that outputs a hashed value, where ranges of hashed value are each mapped to each indication of a computing device that hosts a local lock manager. In the one embodiment, a mapping is maintained by all the authentication routers 130 associating user IDs and the user's home location. In this case, when a user ID is authenticated by the authentication process executing on the router 130, the authentication process makes available the mapping between the user ID and the user's home location. When a client process for the user requests a resource from the resource server, directly or indirectly, the resource server checks the mapping to ascertain the user's home location.

In the preferred embodiment, the mapping between a user's ID and a user's home location is based on the host closest to the terminals where the user is expected to log onto the network most frequently. For example, if a particular user is expected to usually sign onto the network on terminals 110c, 110d, on the second local network of the illustrated embodiment, then the host for the local lock manager on the second local network is chosen as the host to be indicated by the user's home location. In this case, concurrency control server host 140b is indicated by the home location of this particular user.

For example, assume user X who usually signs onto the second local network travels to the location of the first local network and signs onto the network at terminal 110a. The authentication process on authentication router 130a recognizes user X and finds in the mapping that user X has a home location given by the network address of authentication router 130b, the only router in the second local network. In this case, the address of authentication router 130b serves as an indication of the only concurrency control server host 140b connected to the authentication router 130b. The authentication process writes the home location of the user X into the user home location field 135a. When user X operates client process 112a on terminal 110a that requests resource 150, resource server 132a issues a request for a lock from the first local lock manager 141a, as indicated by step 224 in FIG. 2E. The request includes the user home location 135a, such as the network address of authentication router 130b.

In step 232, the first local lock manager receiving the request from the resource server determines the associated concurrency control server host based on the user home location passed by the resource server. For example, first local lock manager 141a determines that the network address of authentication router 130b is associated with local lock manager 141b executing on concurrency control server host 140b connected to authentication router 130b.

In step 234, the first local lock manager determines whether the associated host is the host of the first local lock manager. If so, then the first local lock manager is the controlling local lock manager that grants or denies the request, as indicated by step 238. If the associated host is not the host of the first local lock manager, then, in step 236, the first local lock manager sends a request for a lock to a second local lock manager on the associated host. In this case, the second local lock manager is the controlling local lock manager.

For example, the first local lock manager 141a determines that the concurrency control server host 140b of the user's home location is different from the concurrency control host 140a of the first local lock manager 141a that received the request from the resource server. Therefore, the first local lock manager 141a sends a request for a lock to the second local lock manager 141b on the corresponding concurrency control server host 140b. Local lock manager 141b is the controlling local lock manager.

In step 240, the controlling local lock manager finds the particular lock data structure in its own lock table, which has the same resource ID as the requested resource. The controlling local lock manager retrieves values of the local resource maximum and the local counts from the particular lock data structure. In step 242, the controlling local lock manager determines whether the value of the local count is less than the value of the local resource maximum. If not, the lock is not granted, and in step 246, a denial is sent back to the resource server. If the value of the local count is less than the value of the local resource maximum, then in step 244, the controlling local lock manager grants of the request. This involves incrementing the value of the local count, storing the incremented value in the local count field of the particular lock data structure of the controlling local lock manager, and sending a lock object to the resource server. Alternatively, the lock object can be sent to the first local lock manager which requested the lock, and the first local lock manager can forward the lock object to the resource server.

For example, local lock manager 141b finds lock data structure 144b in its own lock table 142b, which has a value in resource ID 145b that matches the identification of the requested resource 150. Controlling local lock manager 141b retrieves a value of 15 from local resource maximum 146b and a value of "5" from the local count 147b from lock data structure 144b. Because the count of "5" is less than the local resource maximum of "15," the controlling local lock manager 141b increments the count to "6," stores the new value of the local count in the lock data structure 144b, and sends a lock object 149a to resource server 132a. In response to receiving lock 149a, resource server 132a gives access to resource 150 to the client process 112a operated by user X. Thus, visiting user X obtains access to resource 150 based on an allowance of locks allocated to the local lock manager associated with the home location of user X, the second local network.

In this arrangement, it is efficient to assign the local resource maxima among the local lock managers based on how many users are signing on closest to each local lock manager. For example, if seventy-five percent (75%) of the users of a particular resource usually log onto the second network, then it is efficient to set the value of the local resource maximum field in the lock data structure for this particular resource to be equal to 75% of the maximum number of concurrent users. If there are 20 users and the particular resource is licensed for a maximum of 20 concurrent users, then the resource maximum field 146b in FIG. 1 for the lock data structure 144b for the second local network is assigned a value of "15" and the resource maximum field 146a for the first local network is assigned a value of "5."

If 10 of the 15 users travel away from the second network to attend a meeting at the facilities where the first local network is located, the 10 visitors can still log onto the first network and have their requests for the particular resource be granted based on their allowance stored on the host 140b of the controlling local lock manager 141b associated with their home location, the second local network.

Distribution of Local Resource Maxima by Load Balancer

In other embodiments, the local allowance of concurrent users stored in the resource maximum field of the lock data structures of the local lock managers is allowed to change over time. This is useful in several practical circumstances. For example, if an enterprise includes two or more locations that are in different time zones, the workday generally begins earlier in one location than the other. Until the workday begins in the second location, the first location usually has a greater need for the distributed resources on the network. In this case, it is efficient to increase the local allowance for the first location, and decrease the local allowance of the second location until the workday begins in the second location. Similarly, at the end of the day at the first location, it is efficient to decrease the local allowance of the first location and increase the local allowance of the second location.

Changing the local allowances with time is the responsibility of a load balancing process 192, sometimes called a load balancer process or simply a load balancer. In FIG. 1, load balancer 192 executes on a load balancing host 190 connected to the network 180. In other embodiments, load balancer 192 operates on another device, for example, one of the other computing devices depicted in FIG. 1, such as currency control server host 140a.

FIG. 3A is a flowchart that illustrates a high level overview of a load balancer process for adjusting a maximum number of resources associated with each lock manager of the distributed lock manager.

In step 330, the load balancer increments the local resource maximum on a first concurrency control server host for a particular resource and decrements the local resource maximum on a second concurrency control server host for the same particular resource. These changes in the local allowances for a particular resource are constrained to avoid having the aggregate of all the local resource maxima for the particular resource exceed the maximum number of concurrent users for the particular resource. As indicated by step 330 in FIG. 3A, this is done by keeping the aggregate of the local resource maxima constant.

Regularly Scheduled Load Balancing

FIG. 3B is a flowchart that illustrates an embodiment 330a of step 330 shown in FIG. 3A. In step 331, load balancer decrements the local allowance on one host and increments the local allowance on another host on a regular schedule.

For example, on a network of an enterprise with users in multiple time zones, the load balancer decreases the local allowance for hosts of local lock managers supporting users whose workday has ended and increases the local allowance for hosts of local network managers supporting users whose workday is ongoing. Assuming an enterprise has a first local lock manager supporting users in Europe whose workday begins at 10 AM Greenwich Mean Time (GMT) and ends at 6 PM GMT, and a second local lock manager supporting an equal number of users in New York City whose workday begins at 3 PM GMT and ends at 11 PM GMT, then efficiency is gained by using a load balancer that changes the local allowances on the following example schedule. Other schedules, too numerous to describe, could also be followed.

From 3 PM GMT to 6 PM GMT, local allowances for both local lock managers are equal to, for example, 20 concurrent users, because both offices are working. From 6 PM GMT to 11 PM GMT, more users are expected in New York City, and therefore the load balancer automatically increases the local allowance for New York City to 15 while decreasing the local allowance for Europe to 5. This can be done in one step at 6 PM GMT or gradually over a time interval straddling 6 PM GMT. From 10 AM GMT to 3 PM GMT, more workers are expected in Europe than in New York City; therefore, the load balancer automatically decreases the local allowance for New York City to five while increasing the local allowance for Europe to 15. Again, this can be done in one step or gradually. From 11 PM GMT to 10 AM GMT the next day, few workers are expected in either office. During this time interval, the load balancer can leave the local allowances at 15 for the local lock manager supporting New York and five for the local lock manager supporting Europe. Alternatively, if the enterprise includes another location, say, San Francisco, then the local allowance supporting New York is decreased and the local allowance supporting San Francisco is increased during these hours. In this case, from 10 AM GMT to 3 PM GMT, when the local allowance for Europe is increased, the local allowance for San Francisco is decreased rather than decreasing the local allowance for New York City a second time.

Dynamic Load Balancing

Figure 3C:
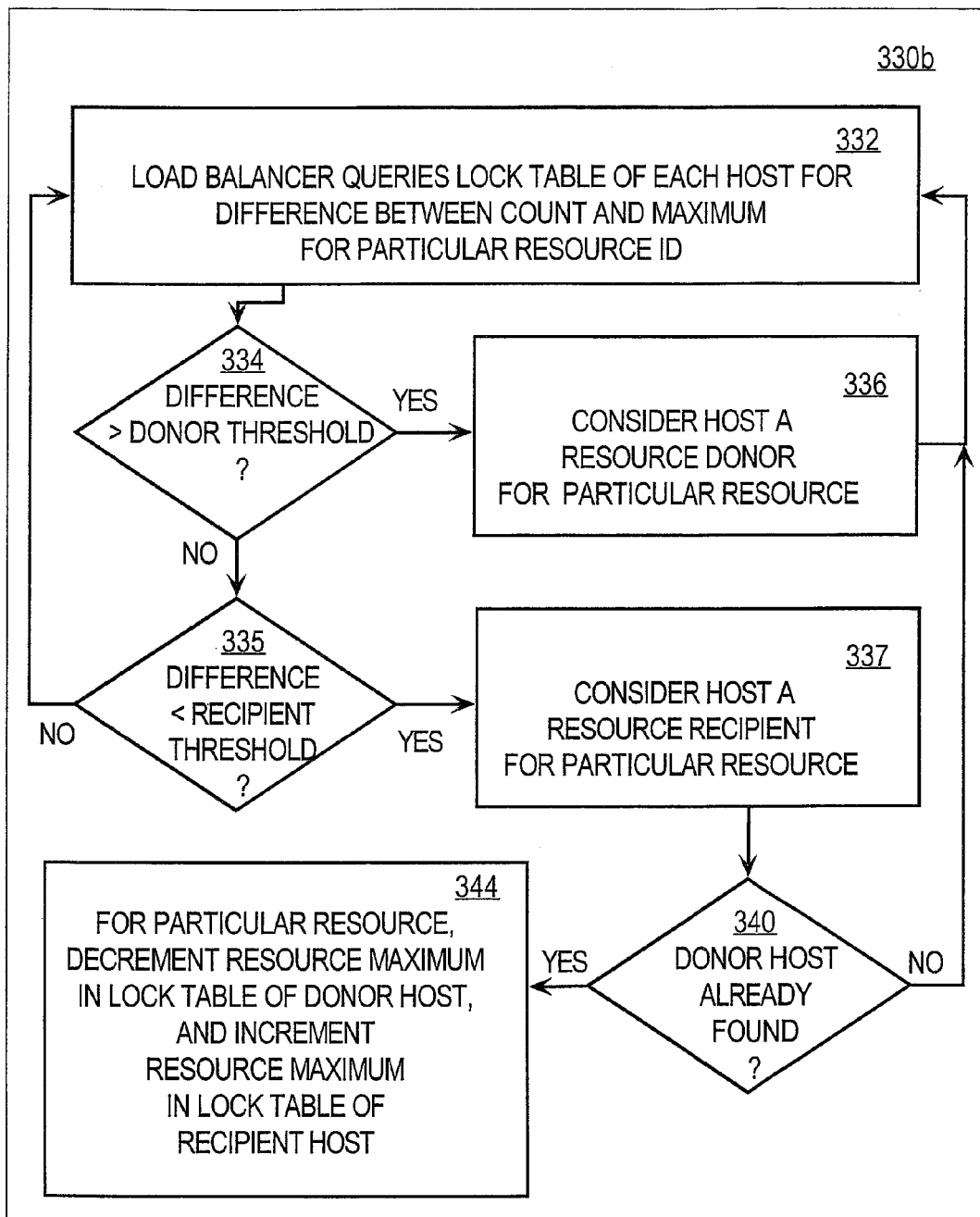
FIG. 3C is a flowchart that illustrates another embodiment of a step shown in FIG. 3A.

FIG. 3C is a flowchart that illustrates another embodiment 330b of step 330 shown in FIG. 3A. In this embodiment, the load balancer checks the values stored by all the local lock managers in the lock data structures for each distributed resource and determines dynamically which local lock managers receive an increase in their allowances for that resource and which local lock managers receive decreases in their allowance for that resource.

In step 332, the load balancer checks the lock table of each host of each local lock manager for the local count and the local resource maximum allowance for each particular resource identified by its resource ID. The load balancer than determines the difference between the values of the local count and the local resource maximum on the host being checked.

In step 334, it is determined whether the difference computed is greater than a predetermined donor threshold. If the difference is large enough, then the local lock manager associated with the host being checked is considered to have an excess allowance, and can afford to donate some of this allowance to another local lock manager that is experiencing greater demands for locks. A host having a difference greater than the donor threshold is considered a resource donor host, and information indicating this is stored by the load balancer in step 336. Control then passes to step 332 to check the next host.

If it is determined in step 334 that the differences is not greater than the predetermined donor threshold, then control passes to step 335. In step 335, it is determined whether the difference is less than a predetermined recipient threshold. If the difference is small enough, then the local lock manager associated the host being checked is considered to have an inadequate allowance, and can benefit by receiving an increase in its allowance. A host having a difference less than the recipient threshold is considered a resource recipient host for this particular resource, and information indicating this is stored by the load balancer in step 337. Control then passes step 340.

In step 340, it is determined whether a donor host has been found in step 336 before the recipient host is found in step 337. If not, then no change is made to the allowance for the recipient host, and control passes back to step 332 to check the next host. However, if it is determined in step 340 that a donor host has already been found, then control passes to step 344 to increase the allowance for the resource on the recipient host.

In step 344, the local allowance for the particular resource on a donor host is decremented by a particular amount based on the donor threshold. For example, the particular amount is set equal to the donor threshold in one embodiment, and is a fraction, such as ½, of the donor threshold in another embodiment. The local allowance for the particular resource on the recipient host is incremented by the particular amount. Control then passes back to step 332 to check the next host.

When the last host is checked, the process begins again with the first host. In this manner, recipient hosts found before a donor host on one round, can be rescued on a succeeding pass through the hosts.

Hardware Overview

Figure 4:
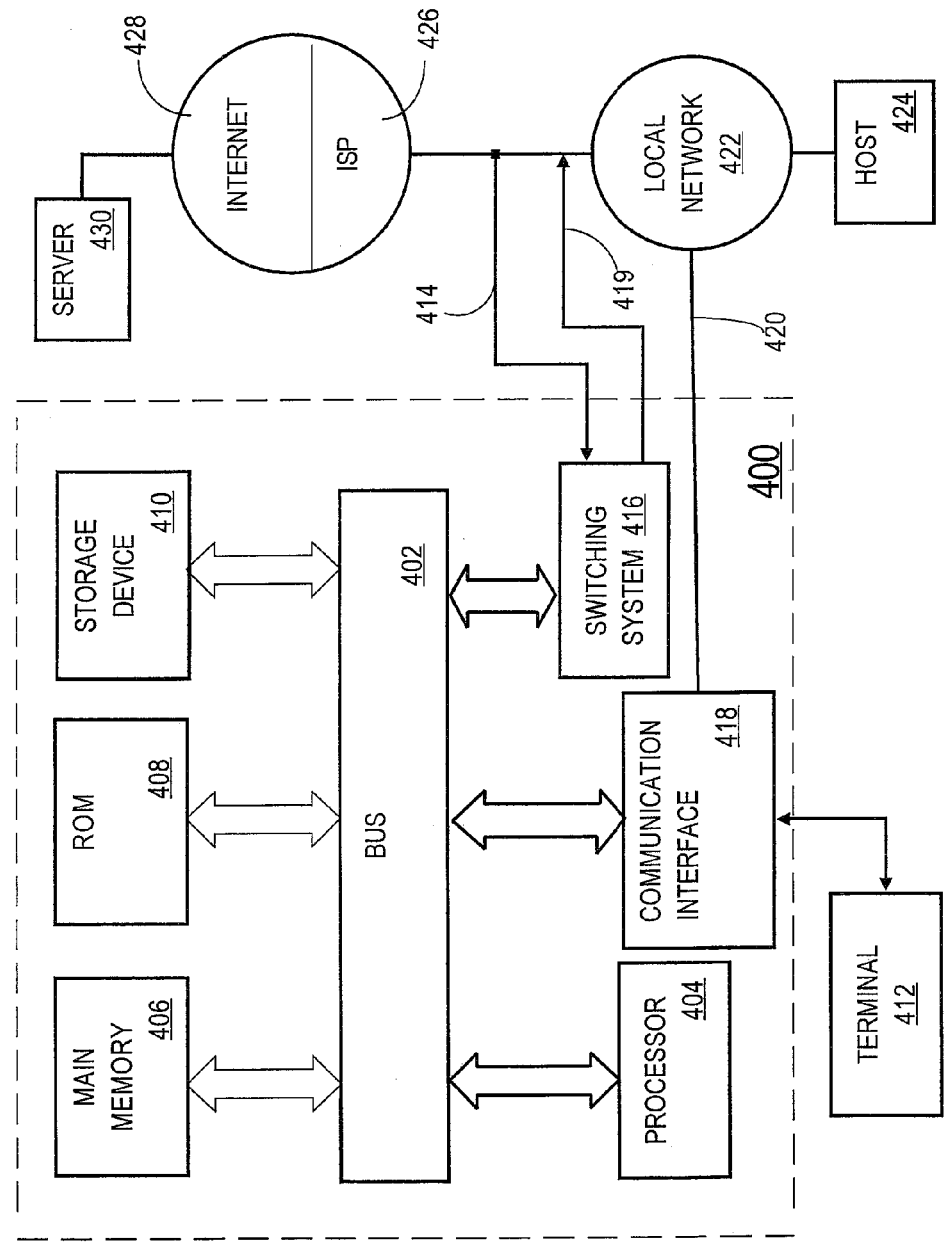
FIG. 4 is a block diagram that illustrates a network router upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. In some embodiments, interface 418 is a conventional serial interface such as an RS-232 or RS-422 interface. An external terminal 412 or other computer system connects to the computer system 400 and provides commands to it using the interface 418. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for controlling concurrent users of a distributed resource. According to one embodiment of the invention, local lock managers of a distributed lock manager process are provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for a local lock manager as described herein.

The received code may be executed by processor 404 as it is received, and/or stored in storage device 410, or other non-volatile storage for later execution. In this manner, computer system 400 may obtain application code in the form of a carrier wave.

SCOPE

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus for controlling use by concurrent users of a distributed resource on a network, wherein use of the distributed resource is limited to a specified maximum number of concurrent users, the apparatus comprising:
   a first host comprising logic encoded in one or more tangible medium for execution;
   wherein the first host is one of a plurality of hosts that are operable to communicatively connect to the network that contains the distributed resource;
   wherein the logic when executed is operable to:
      provide a local lock manager process that executes on the first host;
      associate a user identification for each user of a first set of the concurrent users with the first host; and
      respond to a first request for the distributed resource associated with a first user having a first user identification associated with the first host by requesting a lock from the local lock manager process;
   wherein the local lock manager process may grant a lock on the same resource as another local lock manager process executing on another host of the plurality of hosts at any time when a number of outstanding locks granted on the same resource is less than the specified maximum number of concurrent users.

2. The apparatus of claim 1, wherein the logic is further operable to:
   respond to a second request for the distributed resource associated with a second user having a second user identification associated with a second host of the plurality of hosts by requesting a lock from a second local lock manager process that executes on the second host;
   wherein the second local lock manager process may grant a lock on the same resource as another local lock manager process executing on another host of the plurality of hosts at any time when the number of outstanding locks granted on the same resource is less than the specified maximum number of concurrent users.

3. The apparatus of claim 1, wherein the logic is operable to associate the first user with the first host based on information indicating that the first user signs onto the network most frequently at a terminal node of the network that uses fewer intervening network devices to pass messages to the first host than to any other host of the plurality of hosts.

4. The apparatus of claim 1, wherein the logic is operable to associate the first user with the first host based on information indicating that the first user signs onto the network most frequently at a terminal node of the network that is geographically closer to the first host than to any other of the plurality of hosts.

5. The apparatus of claim 1, wherein:
the local lock manager process comprises a lock data structure associated with the distributed resource and the lock data structure includes a local resource maximum field; and
the logic is further operable to generate and store a value in the local resource maximum field such that a summation over values in the local resource maximum fields maintained by a plurality of local lock manager processes, which respectively execute on the plurality of hosts, does not exceed the maximum number of concurrent users.

6. The apparatus of claim 5, wherein a particular value in the local resource maximum field maintained by the local lock manager process is based on a number of users associated with the first host.

7. The apparatus of claim 5, wherein the logic is further operable to:
determine whether a number of outstanding locks granted by the local lock manager process is less than a particular value stored in the local resource maximum field; and
generate and return a lock object associated with the lock when the number of outstanding locks is less than the particular value.

8. The apparatus of claim 1, wherein a copy of the distributed resource resides on a particular host of the plurality of hosts.

9. The apparatus of claim 1, wherein a copy of the distributed resource resides on a computing device that is not among the plurality of hosts.

10. An apparatus controlling concurrent users of a distributed resource on a network, wherein the distributed resource is limited to a maximum number of concurrent users, the apparatus comprising:
one or more network interfaces that are operable to communicatively connect to the network that contains the distributed resource; and
logic encoded in one or more tangible medium for execution and when executed operable to:
receive a request for the distributed resource from a client process for a user having a user identification;
determine a home location associated with the user identification, the home location indicating a unique host among a plurality of hosts that execute a corresponding plurality of local lock manager processes of a distributed lock manager process;
wherein each of the plurality of local lock manager processes may concurrently grant a lock on the same resource;
send a request for a lock object for the distributed resource to a first local lock manager process of the plurality of local lock manager processes, the request including the home location;
receive the lock object for the distributed resource from a second local lock manager process executing on the unique host when a number of outstanding locks granted by the second local lock manager process is less than a value of a local resource maximum defined for the second local lock manager process; and
provide the client process access to the distributed resource only in response to receiving the lock object.

11. The apparatus of claim 10, wherein a first host on which the first local lock manager process executes is different from the unique host on which the second local lock manager process executes.

12. The apparatus of claim 10, wherein a first host on which the first local lock manager process is executing is in a local network with a computing device on which the client process is executing.

13. The apparatus of claim 10, wherein the logic is further operable to:
determine whether the request received from the client process sets a retry time period; and
when the request received from the client process sets the retry time period, automatically resend within the retry time period the request for the lock object to the first local lock manager process.

14. The apparatus of claim 13, wherein:
each local lock manager process of the distributed lock manager process is configured to store a corresponding local maximum number of users for the distributed resource in a lock data structure associated with said each local lock manager process; and
an aggregate of local maximum numbers in lock data structures associated with all lock manager processes in the distributed lock manager process for the distributed resource is no greater than the maximum number of concurrent users to which the distributed resource is limited.

15. An apparatus controlling concurrent users of a distributed resource on a network, wherein the distributed resource is limited to a maximum number of concurrent users, the apparatus comprising:
one or more network interfaces that are operable to communicatively connect to the network that contains the distributed resource; and
logic encoded in one or more tangible medium for execution and when executed operable to:
generate a value for a local resource maximum stored on each host of a plurality of hosts such that a summation over the plurality of hosts of the value for the local resource maximum yields an aggregate value that does not exceed the maximum number of concurrent users;
determine whether to increase a first value in a first resource maximum stored on a first host of the plurality of hosts;
when the first value in the first resource maximum is to be increased, then:
decrease by a particular amount a second value in a second resource maximum stored on a second host of the plurality of hosts, and
increase by the particular amount the first value in the first resource maximum stored on the first host; and
grant a lock for the distributed resource when a number of outstanding locks granted by a lock manager process executing on the first host is less than the value of the local resource maximum stored on the first host.

16. The apparatus of claim 15, wherein the logic operable to determine whether to increase the first value is further operable to determine the time of day and the geographic location served by the first host.

17. The apparatus of claim 15, wherein the logic operable to determine whether to increase the first value is further operable to determine whether a difference between the number of outstanding locks granted and the first value is less than a first predetermined threshold.

18. The apparatus of claim 15, wherein when the first value in the first resource maximum is to be increased, the logic is further operable to determine whether to decrease the second value based on a whether a difference between the number of outstanding locks granted and the second value is greater than a second predetermined threshold.

19. The apparatus of claim 18, wherein the particular amount is based on the second predetermined threshold.

20. The apparatus of claim 19, wherein the particular amount is no greater than the second predetermined threshold.

* * * * *